United States Patent
Emoto et al.

[11] Patent Number: 5,951,212
[45] Date of Patent: Sep. 14, 1999

[54] THROWAWAY INSERT AND CUTTING TOOL

[75] Inventors: Shigenori Emoto; Atsuhiko Maeta, both of Itami, Japan

[73] Assignee: Sumitomo Electric Industries, Ltd., Osaka, Japan

[21] Appl. No.: 08/799,473

[22] Filed: Feb. 12, 1997

[30] Foreign Application Priority Data

Feb. 13, 1996 [JP] Japan .................................. 8-025059

[51] Int. Cl.$^6$ ................................................... B23C 5/20
[52] U.S. Cl. .............................. 407/34; 407/40; 407/113; 407/114
[58] Field of Search .................................. 407/113, 114, 407/34, 40, 42, 61, 115, 116

[56] References Cited

U.S. PATENT DOCUMENTS

| | | | |
|---|---|---|---|
| 4,294,565 | 10/1981 | Erkfritz | 407/113 |
| 5,032,049 | 7/1991 | Hessman et al. | 407/114 |
| 5,222,843 | 6/1993 | Katbi et al. | 407/114 |
| 5,441,370 | 8/1995 | Pantzar et al. | 407/113 |
| 5,556,239 | 9/1996 | Reiterman | 407/113 |
| 5,597,271 | 1/1997 | Men et al. | 407/113 |
| 5,685,670 | 11/1997 | Satran | 407/113 |
| 5,720,583 | 2/1998 | Bohnet et al. | 407/113 |

FOREIGN PATENT DOCUMENTS

| | | |
|---|---|---|
| 125 568 | 11/1984 | European Pat. Off. . |
| 269 103 | 6/1988 | European Pat. Off. . |
| 287 904 | 10/1988 | European Pat. Off. . |
| 2.161.334 | 7/1973 | France . |
| 7-246505 | 9/1995 | Japan . |
| 7-266120 | 10/1995 | Japan . |

*Primary Examiner*—Andrea L. Pitts
*Assistant Examiner*—Henry W. H. Tsai
*Attorney, Agent, or Firm*—Wenderoth, Lind & Ponack, L.L.P.

[57] ABSTRACT

A substantially square throwaway insert can be used for perpendicular machining if a cutting tool on which the insert is mounted is rotated in either direction. All its four corners can be used as cutting edges. Each cutting edge protrudes outwardly toward the center thereof, as viewed from top of the insert. Also, each cutting edge recedes toward the center as viewed from side of the insert. The insert is mounted on a cutting tool with such an axial rake and a radial rake that each corner of the insert can machine a surface having substantially a right angle.

4 Claims, 5 Drawing Sheets

THROWAWAY INSERT AND CUTTING TOOL

BACKGROUND OF THE INVENITON

This invention relates to a throwaway insert capable of machining surfaces that cross each other at an angle of substantially 90° (such machining is hereinafter referred to as perpendicular machining) on a workpiece, and a cutting tool equipped with such inserts, particularly a rotary cutter such as a face milling cutter, end milling cutter or side cutter. But the throwaway insert of the invention may also be mounted on tools for turning.

For perpendicular machining, triangular throwaway inserts and parallelogrammic ones as shown in FIG. 8 at 21 are used. These inserts have only three and two usable corners, respectively. Substantially square inserts having four usable corners are also known. E.g. in Unexamined Japanese Patent Publication 7-246505, there is disclosed an insert which has a main and an auxiliary cutting edge at each corner and is capable of finish-machining a bottom surface with the auxiliary cutting edge. As viewed from one side, each auxiliary edge is inclined inwardly at a very small angle relative to the main cutting edge. The flank of each main cutting edge comprises a first and a second face, the first face being inclined at a smaller angle than the flank of the auxiliary cutting edge. This substantially square throwaway insert can be used for perpendicular machining. A throwaway insert shown in FIG. 9 is also known.

The conventional substantially square throwaway insert having auxiliary edges can machine a side and a bottom that cross each other at substantially 90°. But such a throwaway insert of this type can be used only when the cutting tool is rotated in one direction. On the tool which is rotated in the opposite direction, this insert has to be replaced with another insert having its main and auxiliary edges arranged in opposite ways. If as viewed from one side of the insert, the main edge extends obliquely downward toward the center, when the depth of cut is larger than half the length of each main cutting edge, a force that pushes the workpiece upward will be produced. This force causes chattering or lowers machining accuracy.

SUMMARY OF THE INVENITON

According to the present invention, there is provided a substantially square throwaway insert having four cutting edges, each edge protruding toward the center of the cutting edge as viewed from the top of the insert, and a cutting tool equipped with a plurality of inserts of the above type, the inserts being mounted so that the cutting tool can machine a workpiece to form two surfaces that cross each other at substantially 90°.

With this arrangement, the same insert can be used when the tool is rotated in either direction. Even though the insert of the present invention has no auxiliary cutting edges, it can form substantially perpendicular surfaces on a workpiece. Since each cutting edge is the lowest at its center as viewed from the side, even when the depth of cut is greater than half the length of the cutting edge, it is possible to suppress the force that acts to push the workpiece upward and thus to improve the machining accuracy.

Now let us imagine a throwaway insert having a square shape as viewed from the top but with its cutting edges receding downwardly toward the center as viewed from the side. If the relief angle γ (FIG. 2) is positive, the insert will look as a square having each side lowest at the center of each side as viewed from top. If this insert is mounted on a cutting tool with a positive axial rake and a negative radial rake, each cutting edge will look extending inwardly at a more acute angle toward its center as viewed from the top. Such an insert can form only surfaces that cross each other at an angle smaller than 90°.

The insert according to the present invention has cutting edges each protruding outwardly from two adjacent corners of the insert. This insert is mounted on a cutting tool at such an axial rake and a radial rake that rectangular machining with substantially 90° is possible with all four corners.

On the throwaway insert according to the present invention, the first and second portions of each cutting edge extend obliquely outwardly toward its center from two adjacent corners of the insert at an angle $\alpha$ of 30' –5° with respect to the straight line connecting the two corners. Thus, the four corners of the insert defined by the adjacent cutting edges have an angle of $90°+2\alpha$, i.e. an angle greater than 90°. This throwaway insert is mounted on a rotary cutting tool with a positive axial rake and a negative radial rake. Most preferably an axial rake should be +5° to +25° and a radial rake should be –5° to –30° If the insert is mounted on a rotary cutting tool, the corner will have an angle slightly larger than 90° as viewed from top. But it is possible to adjust its angle to exactly 90° by adjusting the downward inclination $\theta$ of the first and second portions of each cutting edge with respect to the straight line connecting two adjacent corners of the insert. In other words, the angle $\theta$ is determined so that the corner formed by perpendicular machining is about 90°.

Alternatively, each cutting edge may have an arcuate shape as viewed both from the top and the side so that it is the lowest at the center. For perpendicular machining, such arcuate cutting edges preferably have a radius of curvature of 30–100 mm. In this case, each corner is defined by two convex curves, having an angle of $90°+2\alpha$. When this throwaway insert is mounted on a rotary cutting tool, its axial rake and radial rake are determined so that each corner has a substantially right angle.

Other features and objects of the present invention will become apparent from the following description made with reference to the accompanying drawings, in which:

DETAILED DESCRIPTION OF THE PREFEREED EMBODIMENT

The embodiment of the present invention is now described with reference to the drawings.

Figure 1:
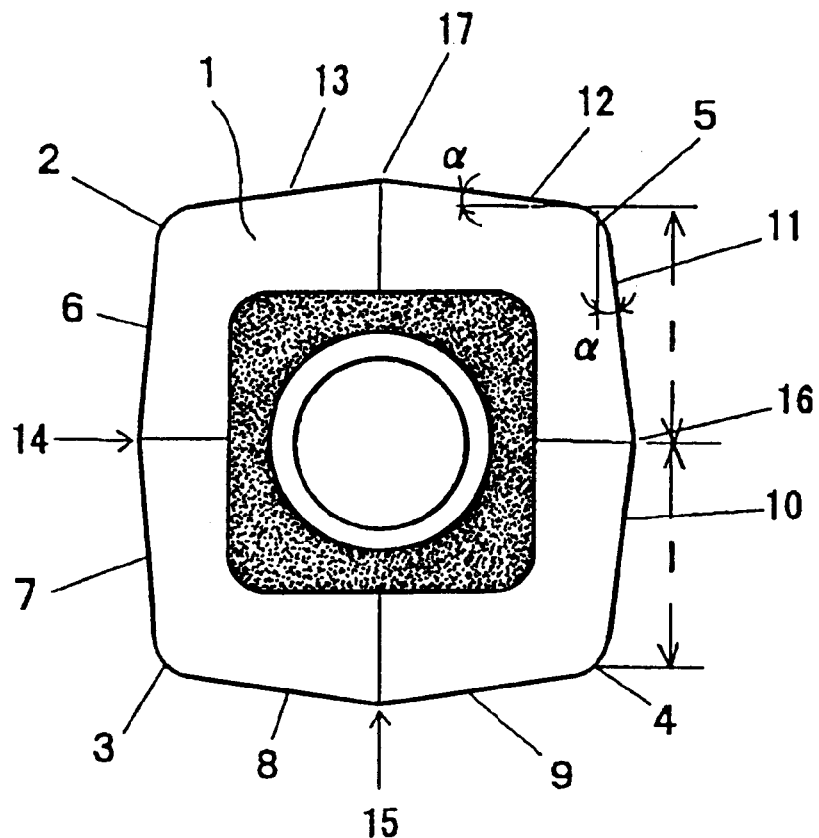
FIG. 1 is a top plan view of a throwaway insert embodying the present invention.
Figure 2:
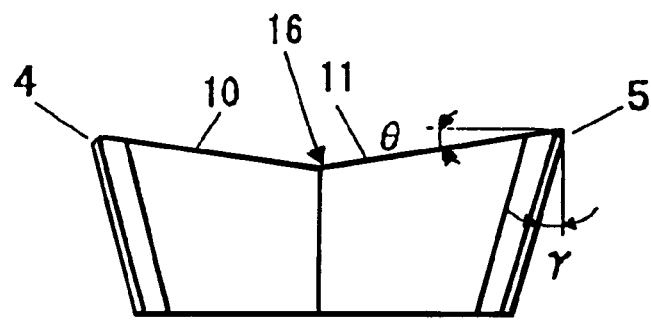
FIG. 2 is its side view.
Figure 3:
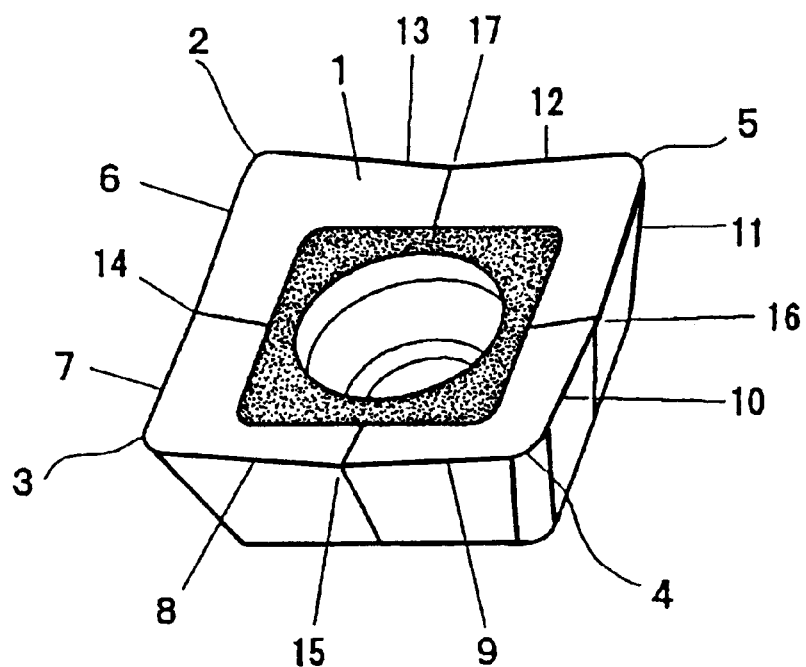
FIG. 3 is its perspective view.

FIGS. 1–3 show the throwaway insert of one embodiment, which is a substantially square, flat, positive insert. As shown in FIG. 1, which is a top plan view of the insert, each of the cutting edges extending between two adjacent ones of the four corners 2, 3, 4 and 5 comprises two substantially straight portions 6 and 7, 8 and 9, 10 and 11, and 12 and 13, respectively. Each pair of straight portions extend obliquely outwardly from the respective corners toward the center 14, 15, 16 and 17 of each cutting edge at an angle α with respect to the straight line connecting the adjacent corners at both ends of the cutting edge, as viewed from top of the insert. In other words, each cutting edge protrudes outwardly toward its center. Thus, in a strict sense, this insert has an octagonal shape as viewed from above.

As shown in FIG. 2, which is a side elevation of the insert, the straight portions 10 and 11 extend obliquely downward from the respective corners 4 and 5 toward the center 16 of the cutting edge at an angle θ. In other words, each cutting edge recedes downwardly toward its center. The angle θ is the value determined by the angle α and the axial rake Ax (FIG. 4) and radial rake Rd (FIG. 5). FIG. 3 shows a perspective view of the throwaway insert.

Figure 4:
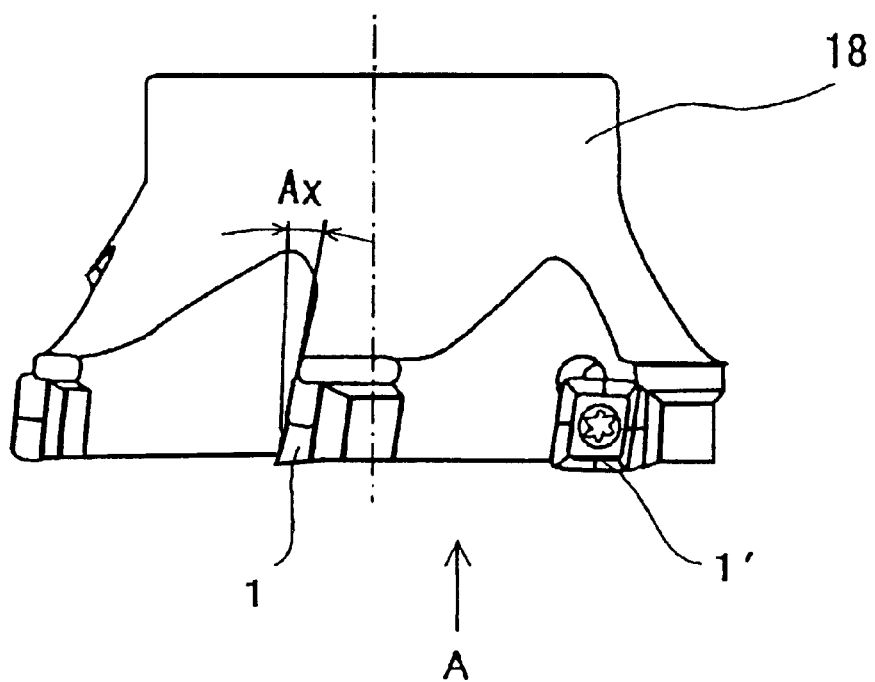
FIG. 4 is a side view of a rotary cutting tool having a plurality of throwaway inserts according to the present invention mounted thereon.
Figure 5:
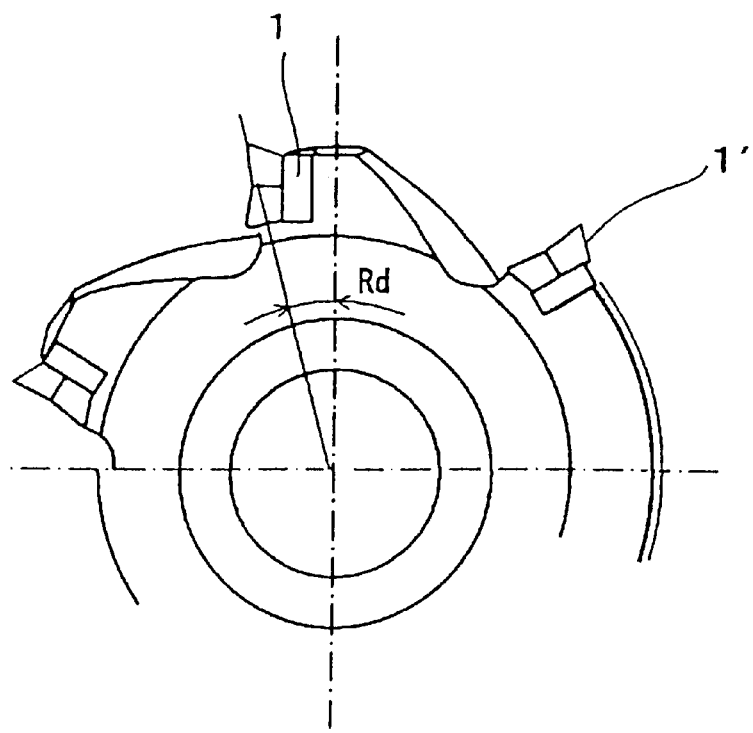
FIG. 5 is a bottom view of the same.

FIG. 4 shows a rotary cutting tool 18 having throwaway inserts 1, 1' of the above embodiment mounted thereon. Ax indicates an axial rake of each insert, which is the inclination angle of the plane including the four corners of the insert with respect to the axis of the cutting tool.

FIG. 5 is a bottom plan view of the tool 18, as viewed from the direction of the arrow A in FIG. 4. Rd indicates a radial rake. In order to maintain edge sharpness and strength, Ax should preferably be set to +5° to +25° and Rd should be set to −5° to −30°.

Figure 6:
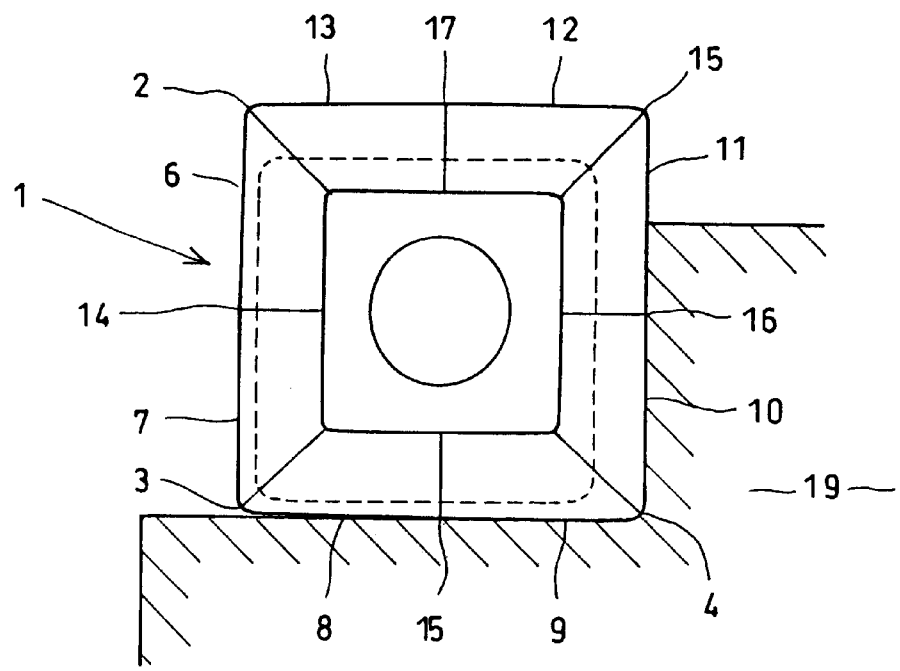
FIG. 6 is a view of a throwaway insert of the present invention mounted on a rotary cutting tool and used for cutting.

FIG. 6 shows how the rotary cutting tool 18 equipped with the throwaway insert 1 is used to cut a workpiece 19. In this figure, the cutting edges 10 and 9 are shown to cross at a nose (or corner) 4 at substantially 90°. The bottom face is finished by a cutting edge 9 whereas a side face that crosses the bottom face at a right angle is formed on the workpiece by the straight portions 10 and 11 of the cutting edge. Since the straight portions 10 and 11, which meet at the center 16, are arranged so that they look as if a single straight line, it is possible to machine the workpiece even if the depth of cut is greater than half the length of the cutting edge. A relief angle of 5' to 30' may be provided between the cutting edge 9 and the workpiece near the nose 4 to reduce the cutting load to the cutting edge 9 during perpendicular machining.

Figure 7:
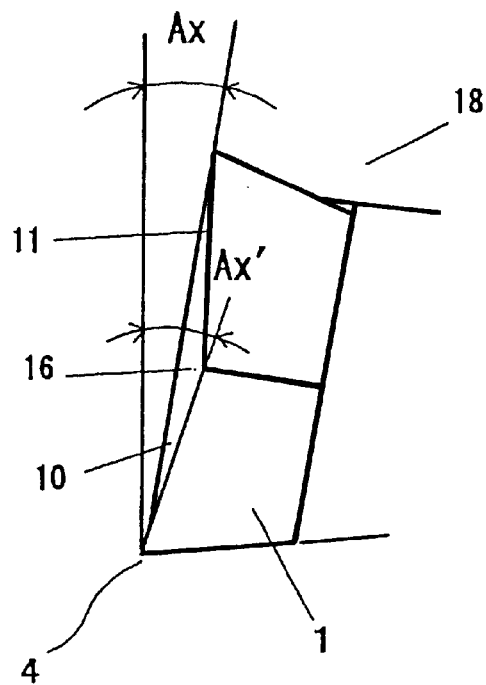
FIG. 7 is a side view of a throwaway insert of the present invention mounted on a rotary cutting tool.
Figure 8:
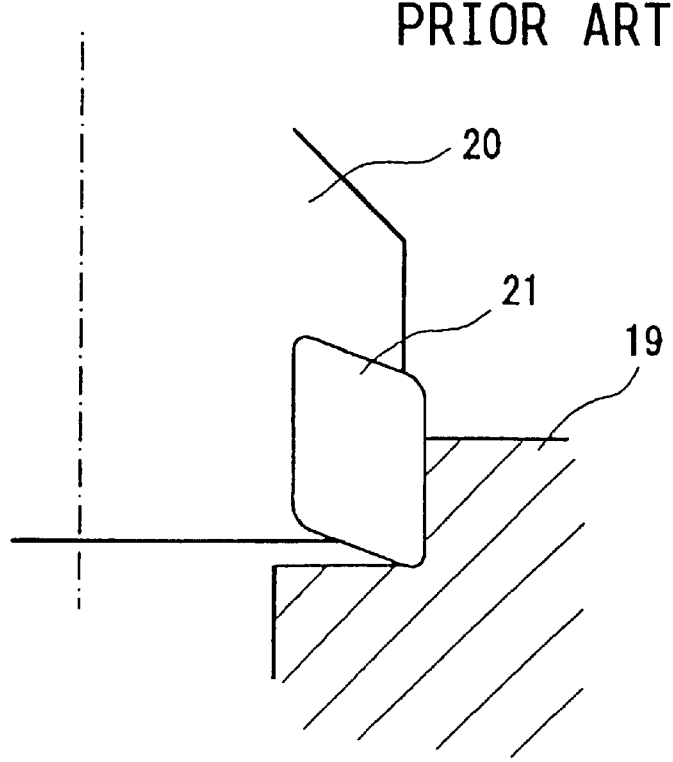
FIG. 8 is a view of a conventional throwaway insert mounted on a rotary cutting tool and used for cutting.
Figure 9:
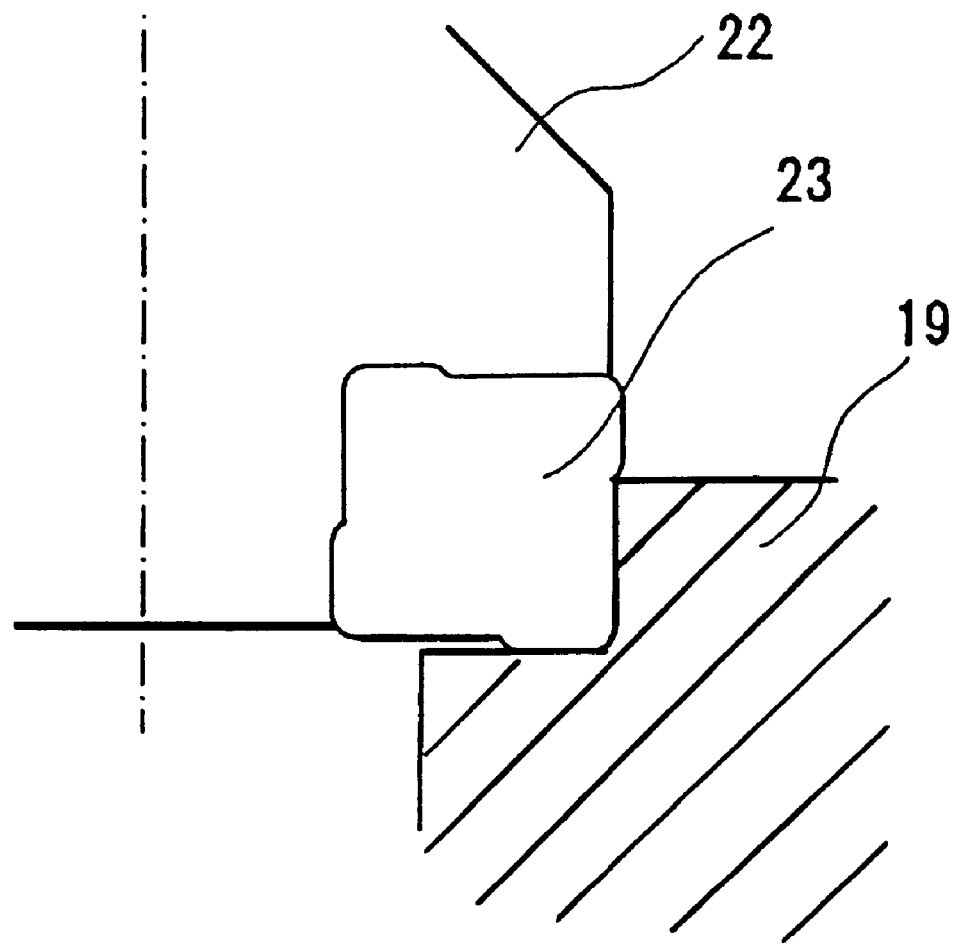
FIG. 9 is a similar view of another conventional throwaway insert.

FIG. 7 shows a side view of the throwaway insert 1 mounted on the rotary cutting tool 18. If only the straight portion 10 is used, i.e. the depth of cut is less than half the length of the cutting edge, the actual axial rake will be Ax'. Sharpness in cutting is high in this state. When both straight portions 10 and 11 are used, i.e. when the depth of cut is greater than half the length of the cutting edge, the actual axial rake will be Ax. Since Ax is smaller than Ax', it is possible to suppress the force that pulls up the workpiece.

The same throwaway insert according to the present invention can be used when the cutting tool is rotated in either direction. No auxiliary cutting edges are needed for perpendicular machining. While the depth of cut is less than half the length of the cutting edge, sharpness in cutting is high. In cuttings in which the depth of cut is greater than half the length of the cutting edge, it is possible to suppress the force that pulls up the workpiece and thus to improve the machining accuracy.

What is claimed is:

1. A cutting tool comprising a body and at least one throwaway insert, the throwaway insert which is substantially square in top plan view and has flanks with a positive relief angle, four corners and four cutting edges, each of said cutting edges extending between an adjacent pair of said corners, each of said cutting edges protruding outwardly toward its center in top plan view and receding downwardly toward its center in side view, wherein each of said cutting edges forms, in top plan view, an angle α of 30' to 5° with respect to a straight line connecting said adjacent pair of corners between which said cutting edge extends, wherein said insert is mounted on said body with an axial rake Ax of +5° to +25° and a radial rake Rd of −5° to −30° so that each corner of said insert forms a substantially right angle in the top plan view of the insert.

2. A cutting tool comprising a body and at least one throwaway insert, the throwaway insert having flanks with a positive relief angle, said insert being of a substantially square shape in top plan view so as to have four corner portions and four elongated cutting edges defined by four sides, respectively, of said substantially square shape, each of said elongated cutting edges extending from one corner portion to the other corner portion of an adjacent pair of said corner portions, each of said cutting edges protruding outwardly toward its center in top plan view and receding downwardly toward its center in side view, wherein said insert is mounted on said body with an axial rake Ax of +5° to +25° and a radial rake Rd of −5° to −30° so that each corner of said insert forms a substantially right angle in the top plan view of the insert.

3. The cutting tool as claimed in claim 2, wherein each of said cutting edges forms, in top plan view, an angle α of 30' to 5° with respect to a straight line connecting said adjacent pair of corners between which said cutting edge extends.

4. The cutting tool as claimed in claim 2, wherein each of said cutting edges includes first and second straight portions, said first straight portion extending from said one corner portion of said adjacent pair of corner portions to said center of said cutting edge, and said second straight portion extending from said other corner portion of said adjacent pair of corner portions to said center of said cutting edge, said first and second straight portions extending obliquely with respect to each other such that said cutting edge protrudes outwardly to an apex at said center of said cutting edge.

* * * * *